(12) United States Patent
Shartzer

(10) Patent No.: US 9,326,017 B2
(45) Date of Patent: Apr. 26, 2016

(54) METHOD AND APPARATUS FOR SETTING CONTROLLED EVENTS FOR NETWORK DEVICES

(71) Applicant: THOMSON LICENSING, Issy de Moulineaux (FR)

(72) Inventor: Lee D Shartzer, Valencia, CA (US)

(73) Assignee: Thomson Licensing, Issy les moulineaux (FR)

( * ) Notice: Subject to any disclaimer, the term of this patent is extended or adjusted under 35 U.S.C. 154(b) by 91 days.

(21) Appl. No.: 13/965,541

(22) Filed: Aug. 13, 2013

(65) Prior Publication Data

US 2014/0143821 A1    May 22, 2014

Related U.S. Application Data

(60) Provisional application No. 61/728,044, filed on Nov. 19, 2012.

(51) Int. Cl.
*G06F 3/00* (2006.01)
*G06F 13/00* (2006.01)
*H04N 5/445* (2011.01)
*H04N 21/41* (2011.01)
*H04N 21/422* (2011.01)
*H04N 21/443* (2011.01)
*H04N 21/258* (2011.01)

(52) U.S. Cl.
CPC ....... *H04N 21/4126* (2013.01); *H04N 21/4222* (2013.01); *H04N 21/42207* (2013.01); *H04N 21/4433* (2013.01); *H04N 21/4438* (2013.01); *H04N 21/25816* (2013.01)

(58) Field of Classification Search
CPC ............... H04N 21/4126; H04N 21/25816; H04N 21/42207; H04N 21/4222; H04N 21/4433; H04N 21/4438
USPC .............................. 725/52, 61, 133, 141, 153
See application file for complete search history.

(56) References Cited

U.S. PATENT DOCUMENTS 7,865,927 B2 * 1/2011 Brodersen et al. ............ 725/109
8,760,498 B2 * 6/2014 Eyer ................................ 348/43
(Continued)

FOREIGN PATENT DOCUMENTS

| EP | 2232365 | 9/2009 |
|---|---|---|
| EP | 2430833 | 3/2012 |
| WO | WO2009076474 | 6/2009 |
| WO | WO2010132718 | 11/2010 |

OTHER PUBLICATIONS

Choi, "XML based Standard Protocol for Remote Control", Transactions of the Korean Institute of Electrical Engineers, vol. 55, No. 5, May 2006, pp. 216-219.
(Continued)

*Primary Examiner* — Jason Salce
(74) *Attorney, Agent, or Firm* — Robert D. Shedd; Robert B. Levy

(57) ABSTRACT

A method for controlling a device during content playback commences by receiving at the device at least one user-entered command to instruct the device to take at least one action upon the occurrence of an event during content playback. The device will execute the command to take the at least one action upon occurrence of the event during content playback. The action can include providing a notification to another device, such as in the form of a URL.

2 Claims, 2 Drawing Sheets

(56) References Cited

U.S. PATENT DOCUMENTS

| | | | |
|---|---|---|---|
| 2002/0162120 A1* | 10/2002 | Mitchell | 725/135 |
| 2004/0215694 A1 | 10/2004 | Podolsky | |
| 2005/0066198 A1 | 3/2005 | Gelme et al. | |
| 2007/0136693 A1 | 6/2007 | Lilleness et al. | |
| 2009/0288131 A1* | 11/2009 | Kandekar et al. | 725/133 |
| 2010/0293190 A1 | 11/2010 | Kaiser et al. | |
| 2012/0030366 A1 | 2/2012 | Collart et al. | |

OTHER PUBLICATIONS

Changhong et al, "Web-Based Remote Control Service System", 2003 IEEE International Symposium on Industrial Electronics, 2003, pp. 337-341.

* cited by examiner

METHOD AND APPARATUS FOR SETTING CONTROLLED EVENTS FOR NETWORK DEVICES

CROSS-REFERENCE TO RELATED APPLICATIONS

This application claims priority under 35 U.S.C. 119(e) to U.S. Provisional Patent Application Ser. No. 61/728,044, filed Nov. 19, 2012, the teachings of which are incorporated herein.

TECHNICAL FIELD

This invention relates to a method and apparatus for allowing a user to control a device during content playback.

BACKGROUND ART

Advances in technology have given rise to a variety of devices capable of displaying audio-visual content, such as television programs or movies. Traditionally, users watched such audio-visual video on television sets. Now with the advent of wireless communications devices such as smart cellular telephones, portable computers and tablets, users can watch audio-visual content on many different devices. In most instances, such wireless communications devices can interact with each other though one or more networks. The ability of such wireless devices to interact with each other can allow a user to watch content while switching between devices.

The current methodology for enabling a user to interact with remote device relies on trap messages using the Simple Network Messaging Protocol. This approach incurs drawbacks.

Thus, a need exists for an easier method for allowing a user to instruct a remote device to perform a given action.

BRIEF SUMMARY OF THE INVENTION

Briefly, in accordance with a preferred embodiment of the present principles there is provided a method for controlling a device during content playback. The method commences by receiving at the device at least one user-entered command to instruct the device to take at least one action upon the occurrence of an event during content playback. The device will execute the command to take at least one action upon occurrence of the event during content playback.

DETAILED DESCRIPTION

Figure 1:
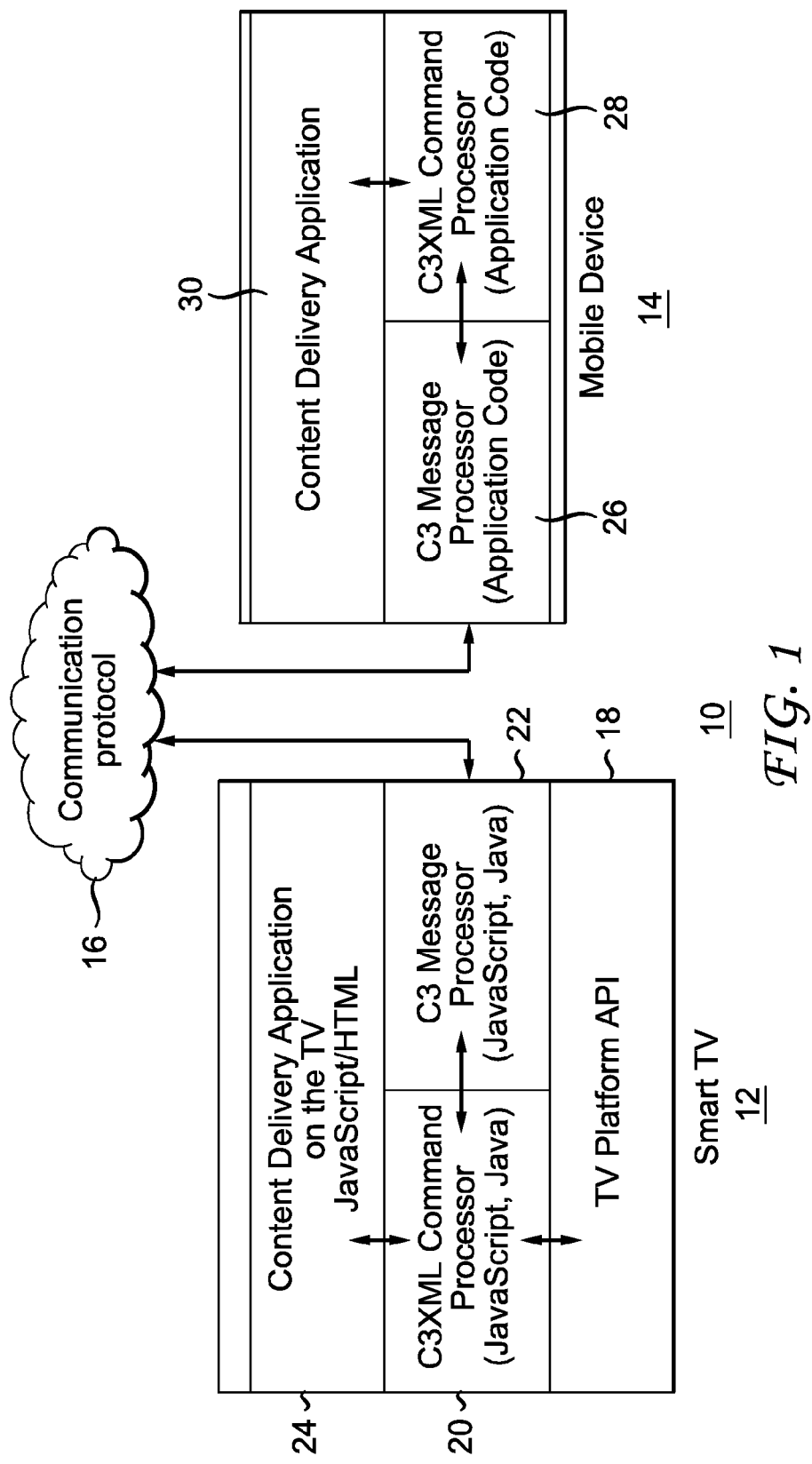
FIG. 1 depicts a block schematic diagram of a first embodiment of system for practicing the device control technique of the present principles.

FIG. 1 depicts a block schematic diagram of a system 10 comprising first and second devices 12 and 14 for enabling remote control of one or both devices via a communications protocol 16 in accordance with the device control technique of the present principles. In practice, the first device 12 comprises a "smart" television set (only a portion of which is shown for purposes of simplicity). The device 12 includes a television platform 18 that includes a microprocessor (not shown) and associated hardware (e.g., read only memory, random access memory, UART(S), etc.) (to provide an application programming interface for executing various applications in order provide video and audio display capability and other functionality associated with a conventional television set.

In addition to the television platform 18, the device 12 of FIG. 1 includes elements 20 and 22 which serve as C3XML and C3 command processors, respectively, for handing C3XML and C3 commands, respectively, which as discussed hereinafter, enable control of the device 12 in accordance with the present principles. For example, the elements 20 and 22 could each take the form of memory elements for storing computer code (e.g., Java or Javascript) for execution by the microprocessor (not shown) comprising part of the TV platform 18 of the device 12. Alternatively, the elements 20 and 22 could each take the form of separate microprocessors or the like and associated hardware (including memories) to executing stored code for processing C3XML and C3 commands, respectively.

The device 12 also includes an element 24, typically a memory, for storing computer code (e.g., Javascript or HTML). (Such computer code, when executed by the microprocessor (not shown) in the television platform 18, enables content downloading to the second device 14 from the device 12 via the communications protocol 16. Rather than comprise a memory, the element 24 could take the form of a separate microprocessor or the like and associated hardware (including one or more memories) for executing computer code to enable content downloading from the device 12 to the device 14 via the communications protocol 16.

In practice, the communications protocol 16 takes the form of a wired or wireless network for interconnecting the devices 12 and 14. For example, the communications protocol 16 could comprise a wireless network that utilizes either the Bluetooth or the IEEE 802.11 protocols or any other well-known wireless communications protocol. The communications protocol 16 could utilize any one of a wide variety of network protocols without departing from the spirit of the device control technique of the present principles.

The device 14 can comprise any one of a variety of wireless communications devices, for example a smart cellular telephone, a lab-top computer, a tablet, etc. The particular structure of the device 14 remains unimportant, provided that the device has the capability of communicating with the smart television set 12 through the communications protocol 16 to download audio-visual content for subsequent playback. For that reason, most of the details of the device 14 have been omitted from FIG. 1.

To effectuate remote control of its operation in accordance with the present principles, the device 14 includes elements 26 and 28 which serve as C3XML and C3 command processors, respectively, for handing C3XML and C3 commands, respectively. For example, the elements 26 and 28 could each take the form of memory elements for storing computer code (e.g., Java or Javascript) for execution by a microprocessor (not shown) (within the device 14. Alternatively, the elements 26 and 28 could each take the form of separate microprocessors or the like and associated hardware (including memories) to executing stored code in connection with processing C3XML and C3 commands, respectively.

The device 14 also includes an element 30, typically a memory, for storing computer code (e.g., Javascript or HTML), which, when executed enables content downloading to the device 14 from the device 12 via the communications protocol 16. Rather than comprise a memory, the element 30 could take the form of a separate microprocessor or the like and associated hardware (including one or more memories) for executing computer code to enable content downloading from the device 12 to the device 14 via the communications protocol 16.

Control of a device, such either of the devices 12 and 14 occurs though user-entered commands, typically in the form of either one or more C3XML or C3 commands, to instruct the device to take at least one action upon the occurrence of a defined condition during content playback. Two examples of such commands include the "Set Cue Point" (referenced as "command 46") and "ToggleEvents" (referenced as "command 36") described hereinafter. Each of these commands, when executed upon the occurrence of a defined condition during content playback, causes the device to perform a particular action.

The SetCuePoint command triggers a given action event upon the reaching a certain point in the content during playback by the device. For example, if content has had a certain time elapse, the device can take an action, including providing a notification to another device. An example of the Set-CuePoint command for the smart television 14, expressed in XML, appears below.

```
<Command id="46" serverDeviceId="device Id of Smart TV"
clientDeviceId="client device Id"
xmlns="http://mgo.com/c3xml/1.0/">
    <CuePoints>
        <Cue>
            <Name></Name>
            <Position></Position>
            <EventInformation></EventInformation>
        <Cue>
        ...
    </CuePoints>
</Command>
<Response commandId="46" serverDeviceId="device Id of Smart TV"
clientDeviceId="client device Id" errorId="" errorMessage=""
xmlns="http://mgo.com/c3xml/1.0/">true/false</Response>
```

Table 1 provides a description of the specific terms for this command.

TABLE 1

| Property | Type | Description |
| --- | --- | --- |
| CuePoints | Collection | Collection of current CuePoints to apply to current content |
| Cue | Object | Container for Cue information |
|  | String | Name of the current cue |
|  | Integer | Position in miliseconds for the cue to fire an event |
| Cue.EventInformation | String | Data to be returned with Cue Event |

The ToggleEvent command turns on or off a particular notification when an event takes place during content playback by the device. Instead of the notification comprising a specific message, the notification take the form of a Uniform Resource Locator (URL) corresponding to a resource available to devices interconnected through the communication protocol 16 of FIG. 1, including a website, media file, server, and the like. An example of the ToggleEvent command for the smart television 14, expressed in XML, appears below.

```
<Command id="36" serverDeviceId="device Id of Smart TV"
clientDeviceId="client device Id"
xmlns="http://mgo.com/c3xml/1.0/">
    <EnableEvents></EnableEvents>
    <EventUrl></EventUrl>
</Command>
<Response commandId="36" serverDeviceId="device Id of Smart TV"
clientDeviceId="client device Id" errorId="" errorMessage=""
xmlns="http://mgo.com/c3xml/1.0/">true/false</Response>
```

Table 1 provides a description of the specific terms for this command

TABLE 2

| Property | Type | Description |
| --- | --- | --- |
| EnableEvents | Boolean | Turns on or off event notification |
| EventURL | String | Alternate URL to be notified of events. |

Figure 2:
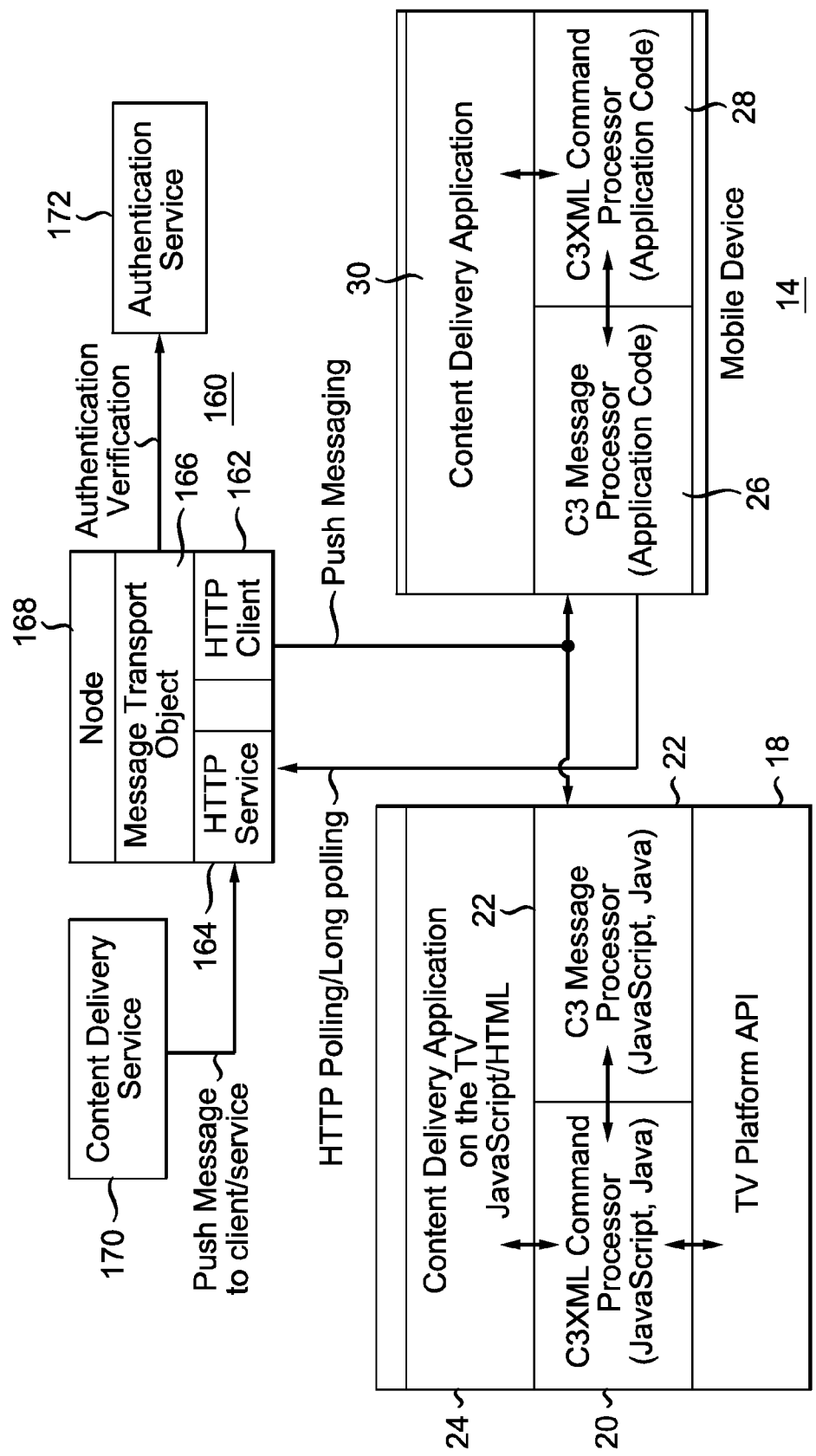
FIG. 2 depicts a block schematic diagram of a second embodiment of system for practicing the device control technique of the present principles.

FIG. 2 depicts a block schematic diagram of a system 100 comprising the first and second devices 12 and 14 for enabling the remote control of one or both devices via a web proxy 160 in accordance with the device control technique of the present principles. The first and second devices 12 and 14 of FIG. 2 have the same structure as the devices 12 and 14 as described for FIG. 1 and like reference numbers identify like elements. The web proxy 160 includes a Hypertext Transfer Protocol (HTTP) client 162 that operates a web browser running computer server or the like (not shown) operating in conjunction with an HTTP service 164 to enable communication between the devices 12 and 14 using the HTTP commands. The proxy server 160 further includes one or more Message Transport Objects 166 (typically one per active device). In connection with the HTTP client 162 and HTTP service 164, the Message Transport Objects 166 manages the HTTP polling/long polling by the devices 12 and 14 to the HTTP service 164 as well as the push messaging by the HTTP client 162 to the devices in response to such polling through a node 168.

The system 100 of FIG. 2 can also include a content delivery service 170 for delivering content to the devices 12 and 14 via the web proxy 160. Further, the system 100 of FIG. 2 can include an authentication server 172 for authenticating the devices 12 and 14 to determine their eligibility to download content from the content delivery service 170.

Control of the devices 12 and device 14 of FIG. 2 occurs in the same manner as discussed above with respect to FIG. 1. In other words, a user enters a command, typically in the form of either a C3XML or C3 command, to instruct the device to take at least one action upon the occurrence of an event during content playback. Just as with the devices 12 and 14 of FIG. 1, the "Set Cue Point" (referenced as "command 46") and the "ToggleEvents" (referenced as "command 36") will cause the device receiving that command to execute the operations described previously with respect to FIG. 1.

The foregoing describes a technique for controlling a device user to control a device during content playback.

The invention claimed is:

1. A method for controlling a device during content playback, comprising the steps of:
   receiving at the device at least one user-entered C3XML command to instruct the device to take at least one action upon the occurrence of an event during content playback; and
   executing the C3XML command to take the at least one action upon occurrence of the event during content playback.

2. A device remotely controllable in connection with content playback by the device, comprising:
   a command processor for receiving at least one user-entered C3XML command to instruct the device to take at least one action upon the occurrence of an event during content playback and for executing that command to take the at least one action upon occurrence of the event during content playback.

* * * * *